(12) United States Patent
Hunukumbure et al.

(10) Patent No.: US 12,316,567 B2
(45) Date of Patent: May 27, 2025

(54) METHOD AND APPARATUS FOR POSITIONING ENHANCEMENTS IN A WIRELESS COMMUNICATION SYSTEM

(71) Applicant: Samsung Electronics Co., Ltd., Suwon-si (KR)

(72) Inventors: Mythri Hunukumbure, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 18/015,628

(22) PCT Filed: Jul. 13, 2021

(86) PCT No.: PCT/KR2021/008964
§ 371 (c)(1),
(2) Date: Jan. 11, 2023

(87) PCT Pub. No.: WO2022/015013
PCT Pub. Date: Jan. 20, 2022

(65) Prior Publication Data
US 2023/0246782 A1    Aug. 3, 2023

(30) Foreign Application Priority Data

Jul. 15, 2020    (GB) ..................... 2010896

(51) Int. Cl.
*H04L 5/00*    (2006.01)
*H04L 5/14*    (2006.01)

(52) U.S. Cl.
CPC .......... *H04L 5/0051* (2013.01); *H04L 5/0064* (2013.01); *H04L 5/14* (2013.01)

(58) Field of Classification Search
CPC ........ H04L 5/0051; H04L 5/0064; H04L 5/14
See application file for complete search history.

(56) References Cited

U.S. PATENT DOCUMENTS

2016/0248563 A1* 8/2016 Behravan .............. H04L 5/1469
2018/0367289 A1   12/2018 Kim et al.
(Continued)

FOREIGN PATENT DOCUMENTS

EP    2 860 903 A1    4/2015

OTHER PUBLICATIONS

Vivo, 'Discussion on potential positioning enhancements', R1-2003429, 3GPP TSG RAN WG1 #101, e-Meeting, May 16, 2020.
(Continued)

*Primary Examiner* — Derrick V Rose
(74) *Attorney, Agent, or Firm* — Jefferson IP Law, LLP

(57) ABSTRACT

A method, performed by a base station, for locating a User Equipment (UE), in a wireless communication, is provided. The method may comprise receiving, from a Location Management Function (LMF) or the UE, a positioning request for the UE; identifying whether dynamic TDD (D-TDD) is currently implemented; and when the D-TDD is currently implemented, configuring a resource set configuration of a Position Reference Signal (PRS) and a Sounding Reference Signal (SRS) to align with slot configuration information of the D-TDD, wherein the resource set configuration of the PRS and the SRS comprises at least one of a periodicity, a slot offset and a repetition factor of the PRS and the SRS.

15 Claims, 6 Drawing Sheets

(56) References Cited

U.S. PATENT DOCUMENTS

2019/0045529 A1  2/2019  Xiong et al.
2019/0109688 A1* 4/2019  Kim ..................... H04L 5/0048

OTHER PUBLICATIONS

Samsung, 'Potential positioning enhancements', R1-2003908, 3GPP TSG RAN WG1 #101, e-Meeting, May 15, 2020.
Qualcomm Incorporated, 'Initial thoughts on Potential Positioning Enhancements', R1-2004492, 3GPP TSG RAN WG1 #101-e, e-meeting, May 16, 2020.
CATT, 'Discussion of NR positioning enhancements', R1-2003642, 3GPP TSG RAN WG1 Meeting #101, e-meeting, May 16, 2020.
Samsung, DL Reference Signals for NR Positioning, 3GPP TSG RAN WG1 #98 R1-1908509, Prague, CZ, Aug. 26-30, 2019.
5G New Radio Fundamentals, Procedures, Testing Aspects, Sep. 2019.
United Kingdom Intellectual Property Office Search Report dated Dec. 14, 2020, issued in United Kingdom Application No. GB2010896.5.

* cited by examiner

METHOD AND APPARATUS FOR POSITIONING ENHANCEMENTS IN A WIRELESS COMMUNICATION SYSTEM

TECHNICAL FIELD

The present disclosure relates generally to wireless communication systems, ore specifically, the present disclosure relates to method apparatus and/or systems for positioning enhancements.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multipleoutput (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), nonorthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

DISCLOSURE OF INVENTION

Solution to Problem

A method, performed by a base station, for locating a User Equipment (UE), in a wireless communication, is provided. The method may comprise receiving, from a Location Management Function (LMF) or the UE, a positioning request for the UE; identifying whether dynamic TDD (D-TDD) is currently implemented; and when the D-TDD is currently implemented, configuring a resource set configuration of a Position Reference Signal (PRS) and a Sounding Reference Signal (SRS) to align with slot configuration information of the D-TDD, wherein the resource set configuration of the PRS and the SRS comprises at least one of a periodicity, a slot offset and a repetition factor of the PRS and the SRS.

BRIEF DESCRIPTION OF DRAWINGS

For a more complete understanding of the present disclosure and its advantages, reference is now made to the following description taken in conjunction with the accompanying drawings, in which like reference numerals represent like parts.

BEST MODE FOR CARRYING OUT THE INVENTION

Figure 1:
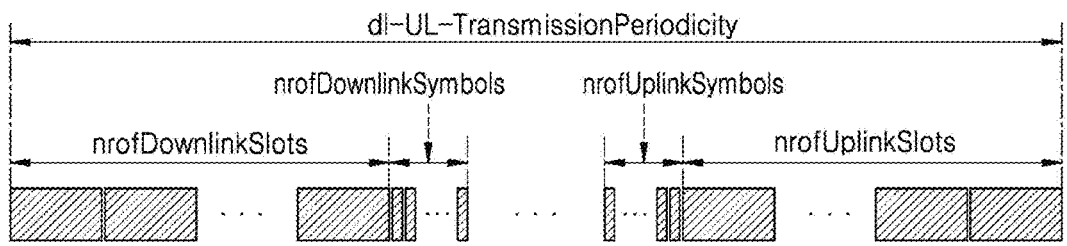
FIG. 1 illustrates a Dynamic TDD timing configuration for 5G-NR.

In one embodiment, a method, performed by a base station, for locating a User Equipment (UE), in a wireless communication, is provided. The method may comprise receiving, from a Location Management Function (LMF) or the UE, a positioning request for the UE; identifying whether dynamic TDD (D-TDD) is currently implemented; and when the D-TDD is currently implemented, configuring a resource set configuration of a Position Reference Signal (PRS) and a Sounding Reference Signal (SRS) to align with slot configuration information of the D-TDD, wherein the resource set configuration of the PRS and the SRS comprises at least one of a periodicity, a slot offset and a repetition factor of the PRS and the SRS.

In one embodiment, the slot configuration information of the D-TDD may comprise a slot configuration period, a number of downlink slots and a number of uplink slots. In addition, the PRS may be configured within a first downlink slots and the SRS is configured within a last uplink slots.

In one embodiment, the PRS and the SRS may be not configured within slots with only flexible symbols, wherein the PRS and the SRS may be not configured within slots with only flexible symbols. In addition, the flexible symbols may comprise symbols for both downlink and uplink.

In one embodiment, the periodicity of the PRS and/or the SRS is configured to an integer multiple of the slot configuration period.

In one embodiment, the slot offset of the PRS is lower than the slot offset of the SRS such that the PRS is configured within the first downlink slots and the SRS is configured within the last uplink slots.

In one embodiment, the repetition factor of the PRS and/or the SRS is configured such that the PRS is configured within the first downlink slots and the SRS is configured within the last uplink slots.

In one embodiment, the PRS and/or the SRS are configured based on a Comb-N pattern.

In one embodiment, the method further comprises receiving, from the LMF, a required quality of service (QoS) level; identifying whether the required QoS level is met; and when the required QoS level is not met, re-configuring the resource set configuration of the PRS and the SRS to align with the slot configuration information of the D-TDD, wherein the required QoS level comprises at least one of accuracy requirements and latency requirements.

In one embodiment, the slot configuration information of the D-TDD may be applied across all cells in a network, wherein a similar periodicity, a similar slot offset and a similar repetition factor may be applied for the PRS and/or the SRS across all the cells.

In one embodiment, a comb-N pattern, the periodicity, the slot offset and the repetition factor of the PRS and the SRS may be configured such that the PRS and the SRS are configured within slots with only flexible symbols. In addition, the slots with only flexible symbols may be located in a central part of a dynamic TDD configuration, wherein the flexible symbols comprise symbols for both downlink and uplink.

In another embodiment, a base station for locating a User Equipment (UE), in a wireless communication is provided. The base station may comprise a transceiver; and at least one processor configured to: receive, from a Location Management Function (LMF) or the UE, a positioning request for the UE; identify whether dynamic TDD (D-TDD) is currently implemented; and when the D-TDD is currently implemented, configure a resource set configuration of a Position Reference Signal (PRS) and a Sounding Reference Signal (SRS) to align with slot configuration information of DTDD, wherein the resource set configuration of the PRS and the SRS comprises at least one of a periodicity, a slot offset and a repetition factor of the PRS and the SRS.

In yet another embodiment, the slot configuration information of the D-TDD may comprise a slot configuration period, a number of downlink slots and a number of uplink slots. In addition, the PRS may be configured within a first downlink slots and the SRS is configured within a last uplink slots.

In yet another embodiment, PRS and the SRS may be not configured within slots with only flexible symbols, wherein the PRS and the SRS may be not configured within slots with only flexible symbols. In addition, the flexible symbols may comprise symbols for both downlink and uplink.

In yet another embodiment, the periodicity of the PRS and/or the SRS is configured to an integer multiple of the slot configuration period.

In yet another embodiment, the slot offset of the PRS is lower than the slot offset of the SRS such that the PRS is configured within the first downlink slots and the SRS is configured within the last uplink slots.

In yet another embodiment, the repetition factor of the PRS and/or the SRS is configured such that the PRS is configured within the first downlink slots and the SRS is configured within the last uplink slots.

In yet another embodiment, the PRS and/or the SRS are configured based on a Comb-N pattern.

In yet another embodiment, the at least one processor may be further configured to: receive, from the LMF, a required quality of service (QoS) level; identify whether the required QoS level is met; and when the required QoS level is not met, re-configure the resource set configuration of the PRS and the SRS to align with the slot configuration information of the D-TDD, wherein the required QoS level comprises at least one of accuracy requirements and latency requirements.

In yet another embodiment, the slot configuration information of the D-TDD may be applied across all cells in a network, wherein a similar periodicity, a similar slot offset and a similar repetition factor may be applied for the PRS and/or the SRS across all the cells.

In yet another embodiment, a comb-N pattern, the periodicity, the slot offset and the repetition factor of the PRS and the SRS may be configured such that the PRS and the SRS are configured within slots with only flexible symbols. In addition, the slots with only flexible symbols may be located in a central part of a dynamic TDD configuration, wherein the flexible symbols comprise symbols for both downlink and uplink.

Mode for the Invention

The related standards for the PRS and SRS parameter configurations are given in standard specifications identified as TS 38.211 sections 7.4.1.7 and 6.4.1.4 respectively. The con figuration formats for Dynamic TDD are given in TS 38.213, section 11.1. Embodiments of the present disclosure relate to modifications of these configurations to enable improved performance in a D-TDD setting.

In Industry IoT (IIoT) networks there are requirements to position UEs and IoT devices with high precision, low latency and lower energy consumption. Amongst the positioning methods specified, OTDoA (Observed Time Difference of Arrival) methods provide high accuracy and are also resilient to common physical layer imperfections. To implement OTDoA-based positioning, the UE reads reference signals from multiple base stations in the downlink and multiple base stations read a UE reference signal in the uplink. The Industry IoT networks typically contain a high number of densely packed small cells in their design, so the availability of multiple neighbour cells for OTDoA implementation is possible.

The Industry IoT networks will typically be operated as private (or Non-public) networks, with a closed subscriber group (CSG). The events within the IIoT network premises will be highly co-ordinated and scheduled, like specific manufacturing/processing operations performed during work shifts, and people moving in and out at the end of the shifts. Therefore, if certain applications require dynamic TDD configurations from the network cells, this can be easily co-ordinated amongst multiple cells.

In the previous LTE specifications dynamic TDD can be configured only at the subframe level. In 5G-NR Release 15/16 however, Dynamic TDD is configured when there is a need to flexibly allocate the number of downlink and uplink slots and even symbols within a slot. This need can come from the dynamic nature of the data traffic or because of the need to achieve very low latency, for example, by speeding up the HARQ feedback response times. Dynamic TDD can be configured with a slot format, which includes slots with only downlink symbols, slots with only uplink symbols and mixed symbol slots for flexible configuration. The configuration formats are given in TS 38.213, section 11.1. The configuration is indicated by the parameter 'tdd-UL-DL-ConfigurationCommon'.

As per this indication, the subcarrier spacing (SCS) is specified and for this SCS a configuration is given by Pattern1 or Pattern1+Pattern2. As per Pattern1, a slot configuration period of P msec is given by the parameter dl-UL-TransmissionPeriodicity. The periodic pattern is shown in FIG. 1.

The pattern contains slots with only Downlink symbols ($N_D$) at the start, slots with only Uplink symbols ($N_U$) at the end and slots with only mixed Downlink and Uplink symbols ($N_{D+U}$) in the middle. The individual slot numbers are configurable within the pattern.

The periodicity P is linked to the SCS employed, given by the parameter μ. A value P=0.625 ms is valid only for μ=3. A value P=1.25 ms is valid only for μ=2 or μ=3. A value P=2.5 ms is valid only for μ=1, or μ=2, or μ=3. This μ=1 implies the lowest SCS considered here is $15 \times 2^1$ kHz=30 kHz. The number of slots (S) within the P ms period is given by: $S=P \times 2^\mu$.

For example, for the 30 kHz SCS, the P=2.5 ms period will include 5 slots which can be configured with different numbers of $N_D$, $N_U$ and $N_{D+U}$. The periodicity should also fit-in with 20 ms such that the first symbol every 20/P periods is a first symbol of an even frame. This means there should be an even number of periods fitting into 20 ms.

There is another period defined as $P_2$ with similar properties of containing different values $N_D$, $N_U$ and $N_{D+U}$, so the overall periodicity then becomes $P_o=P+P_2$.

Both PRS and SRS can be configured as comb-N patterns, where the PRS/SRS sequence bits occupy broadly diagonal RE (resource element) positions in the particular slot. The positioning accuracy is higher when the N number is higher (Comb-12 for PRS, Comb-8 for SRS, for example) or the patterns is denser with a lower N number but with multiple PRS symbols per sub-carrier.

Figure 2A:
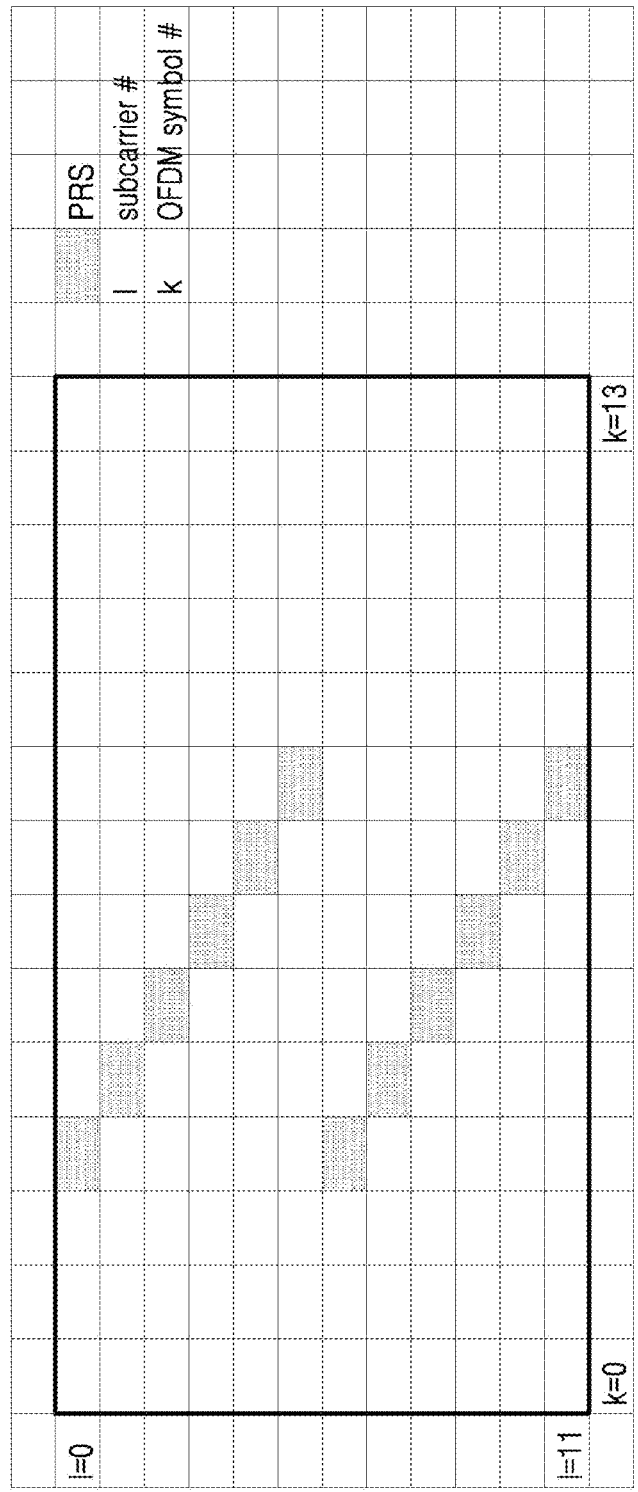
FIG. 2A illustrates comb patterns associated with PRS.
Figure 2B:
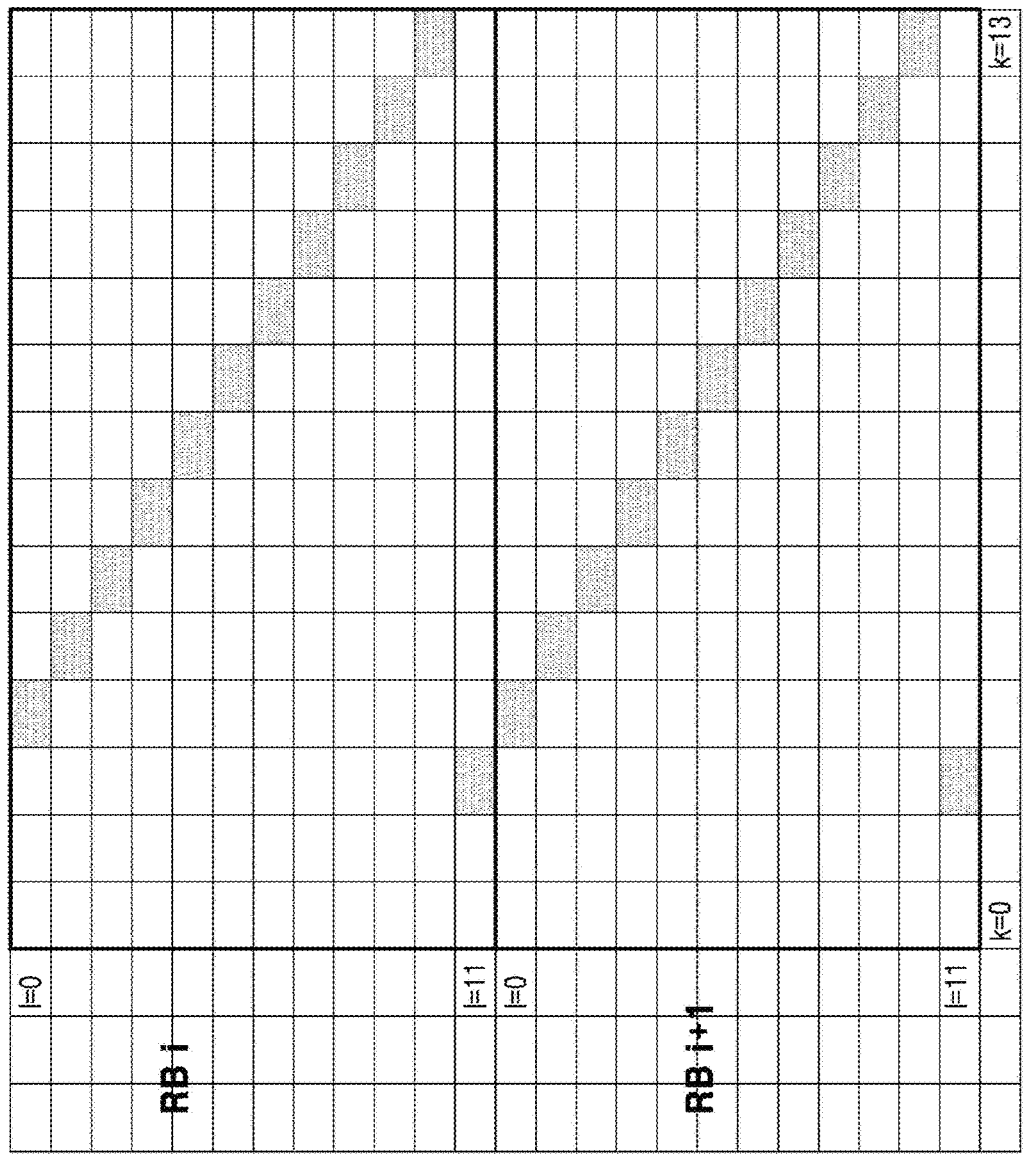
FIG. 2B illustrates comb patterns associated with PRS.

FIGS. 2A and 2B show two different variants for Comb PRS patterns, with FIG. 2A showing a Comb-6 pattern and FIG. 2B showing a Comb-12 pattern. The skilled person will recognizse that these are exemplary only and other configurations are possible.

The PRS/SRS patterns should occupy virtually all of the subcarriers in the slot, rather than having a sparse pattern. In the situation where dynamic TDD is configured and a certain QoS level (through positioning accuracy) has been specified by higher layer signaling, the PRS and SRS should be configured as a higher number Comb-N (e.g.: Comb-12) pattern or dense Comb-6 or 3 pattern, where possible. To facilitate this within dynamic TDD set-up, the PRS should be configured within the first ND slots and the SRS should be configured within the last $N_U$ slots. PRS/SRS allocation within the middle $N_{D+U}$ slots should be avoided, if this option is available.

In order to configure the PRS/SRS as set out above, the following configuration steps are provided:

a) The periodicity of the dynamic TDD 'tdd-UL-DL-ConfigurationCommon' parameter is taken into consideration when setting the periodicity of the PRS and SRS. The 'tdd-UL-DL-ConfigurationCommon' parameter periodicity is given by the value P or $P_o$ as discussed above.

The periodicity of the PRS and SRS is configured to be an integer multiple N of the above dynamic TDD periodicity value P or $P_o$, with N={1, 2, 3, . . . }. The chosen value of N will also depend on the Quality of Service (QoS) level (related to accuracy and update rate) set for the positioning application through higher layer signalling. For example, the possible periodicity values of PRS are specified in TS 38.211 (v16.1.0) section 7.4.1.7 as follows:

$$T_{per}^{PRS} \in \{4, 5, 8, 10, 16, 20, 32, 40, 64, 80, 160, 320, 640, 1280, 2560, 5120, 10240\}$$

is given by the higher-layer parameter 'DL-PRS-Periodicity'

Within this set of possible PRS periodicity values, the multiples of 5 (slots) can be seen as in synchronisation with the dynamic TDD periodicity (P or $P_o$) of 'tdd-UL-DL-ConfigurationCommon'. Thus, a subset of $T_{per}^{PRS}$ is chosen which falls into the same periodic pattern of P or Po. The exact periodicity value should be chosen, based on the QoS requirements, from this sub-set of $T_{per}^{PRS}$.

A similar subset of periodicity values is chosen for SRS (to synchronise with the dynamic TDD periodicity P or $P_o$).

b) The slot offset for the PRS and SRS is configured such that the PRS falls on the first $N_D$ slots of the dynamic TDD configuration and the SRS falls on the last $N_U$ slots. Thus, the PRS will have a lower slot offset and the SRS will have a higher slot offset. The prior art standards allow this slot offset for PRS or SRS resource to vary from 0 to a value of periodicity−1, so this slot offset can be easily configured. For example, the PRS slot offset values are specified in TS 38.211 (v16.1.0) section 7.4.1.7 as follows:

the slot offset $T_{offset}^{PRS} \in \{0,1, \ldots, T_{per}^{PRS}-1\}|$ is given by the higher-layer parameter 'DL-PRS-ResourceSet-SlotOffset'.

For PRS slot offset, a subset of the above values is chosen so that it falls within the first ND slots of the dynamic TDD configuration. For SRS slot offset, a subset of the values (specified in TS 38.211, section 6.4.1.4) is chosen so that SRS falls within the last $N_U$ slots of the dynamic TDD configuration.

c) If repetition of the PRS or SRS resource is needed (as governed by the QoS requirements), the repetition values are chosen so that the repeated PRS falls within the first ND slots, and the repeated SRS falls within the last $N_U$ slots of the dynamic TDD configuration.

The middle $N_{D+U}$ slots in dynamic TDD contains symbols for both downlink and uplink. These are configured, for example, for mini-slot transmissions in the downlink with HARQ and for HARQ ACK/NACK in the uplink, in the same time slot, thereby enabling very low latency communications. If there is a need to achieve very low latency positioning and there are sufficient DL and UL symbols available in these $N_{D+U}$ slots, then the PRS and SRS are configured with suitable comb-N patterns, to fit within these middle $N_{D+U}$ slots. The PRS and SRS periodicity, slot offset and repetition factor are configured accordingly, to fit within these middle $N_{D+U}$ slots. The dynamic TDD slot periodicity is still be governed by P or $P_U$ (as discussed above) but the slot offset and repetition values change to reflect the middle $N_{D+U}$ slots.

According to an embodiment of the invention, when dynamic TDD is in operation, the PRS and SRS (for positioning) reference signals follow the dynamic TDD periodicity and the slot configuration. The decisions on where to place the PRS and SRS (within $N_D$, $N_U$ or within $N_{D+U}$) are based on the accuracy and the latency levels required in the QoS for the positioning requests.

Figure 3:
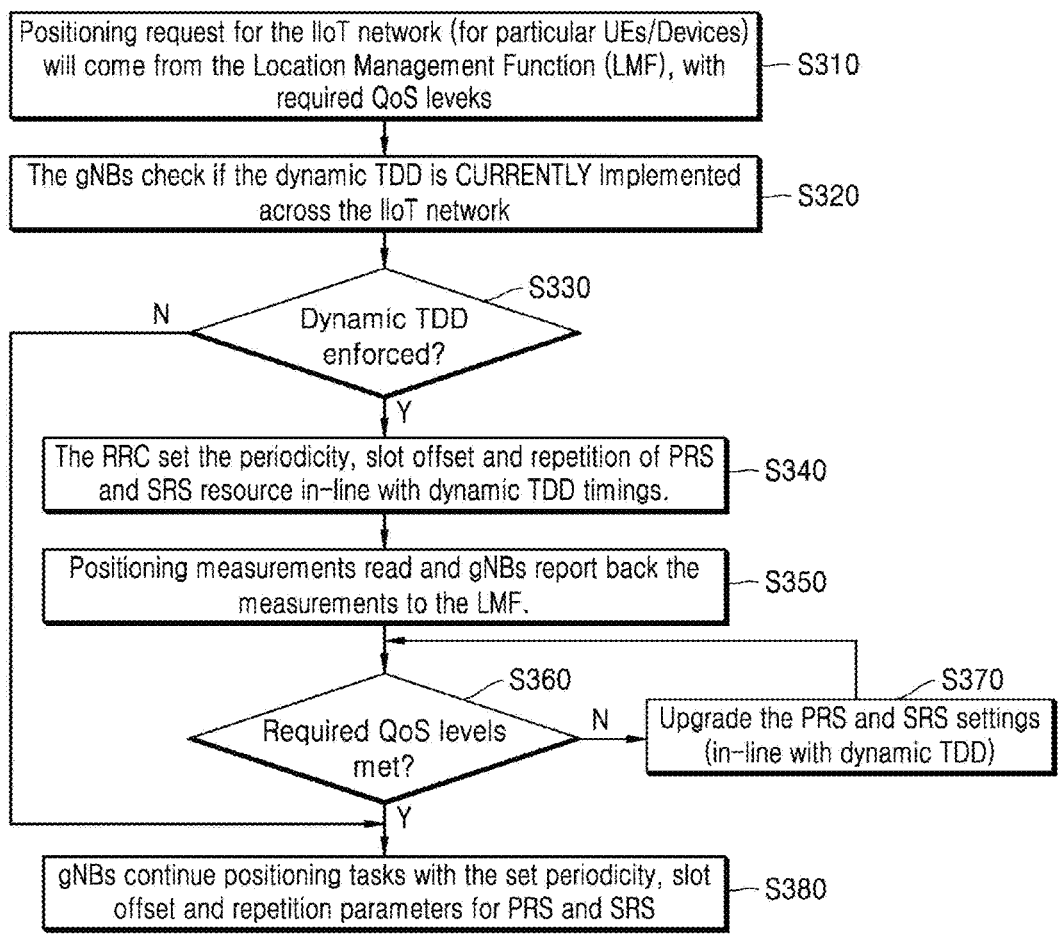
FIG. 3 illustrate a flowchart associated with a method according to an embodiment of the present disclosure.

A flow chart is provided in FIG. 3 which illustrates a method according to an embodiment of the invention.

At S310, a positioning request for the IIoT network (which may be for particular UEs/Devices) is received from the Location Management Function (LMF), together with required QoS levels.

At S320, the base stations (gNBs) check if D-TDD is currently implemented across the IIoT network.

At S330, a check is made to see if D-TDD is enforced.

If not, flow continues to S8 where the gNBs continue their positioning task with the already set periodicity, slot offset and repetition parameters for PRS and SRS.

If the check at S330 determines that D-TDD is enforced, then flow continues to S340 where the Radio Resource Control (RRC) sets the periodicity, slot offset and repetition of PRS and SRS resources in line with the D-TDD timings.

At S350 positioning measurements are made and the gNBs report back the measurements to the LMF.

At S360, a check is made to determine if the required QoS levels are met. If not, then flow continues to S370, where the PRS and SRS settings are upgraded in line with the D-TDD configuration. Flow then returns to S360 again.

At S360, if the required QoS levels are met, then flow continues to S8 where the gNBs continue their positioning task with the set periodicity, slot offset and repetition parameters for PRS and SRS.

In a further embodiment, all cells in the IIoT network synchronise to a single time alignment for transmissions, including for PRS and SRS. This may be achieved by applying a single dynamic TDD slot configuration and selecting similar periodicity, slot offset and repetition parameters for PRS/SRS across all the cells. In non-public IIoT networks, arranging such a synchronisation configuration is easier than in public networks. It also saves energy and resources for mobile UEs and devices, as the need to align with the new TDD format when moving through cells is avoided. To increase the hearability of certain neighbouring cells, muting patterns for PRS/SRS may be employed. This level of synchronisation for PRS/SRS enables the UEs/IoT devices to receive/transmit the signals in a short time window. This, in turn, reduces the energy consumption within the UEs/IoT devices, which is a key requirement in IoT based communications and positioning. This may be applied in 5G-NR as well as for enhancements to Narrowband IoT (NB-IoT).

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Figure 4:
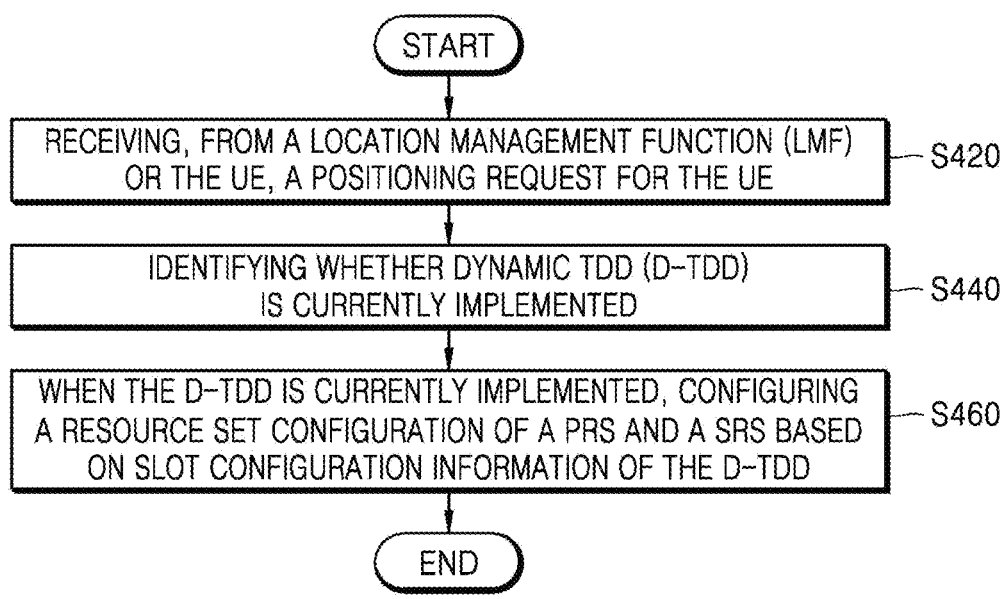
FIG. 4 is a flow diagram of operation performed by a base station according to an embodiment of the present disclosure.

FIG. 4 is a flow diagram of operation performed by a base station according to an embodiment of the present disclosure.

As shown in FIG. 4, in operation 420, the base station may receive, from a Location Management Function (LMF) or the UE, a positioning request for the UE. Also, the base station may receive, from the LMF, a required quality of service (QoS) level along with the positioning request. In one embodiment, the required QoS level may comprise at least one of accuracy requirements and latency requirements.

In operation 440, the base station may identify whether dynamic TDD (D-TDD) is currently implemented. In one embodiment, the base station check if D-TDD is currently enforce across the IIoT (Industry IoT) network.

In operation 460, when the D-TDD is currently implemented, the base station may configure a resource set configuration of a Position Reference Signal (PRS) and a Sounding Reference Signal (SRS) based on slot configuration information of the D-TDD. In one embodiment, the resource set configuration of the PRS and the SRS comprises at least one of a periodicity, a slot offset and a repetition factor of the PRS and the SRS. Also, the slot configuration information of the D-TDD may comprise a slot configuration period, a number of downlink slots and a number of uplink slots, In one embodiment, the base station may configure the resource set configuration of the PRS and SRS such that the PRS is configured within a first downlink slots and the SRS is configured within a last uplink slots. For example, the base station may configure the periodicity of the PRS and/or the SRS to be an integer multiple of the slot configuration period. Also, the base station may configure the slot offset of the PRS to be lower than the slot offset of the SRS such that the PRS is configured within the first downlink slots and the SRS is configured within the last uplink slots. The base station may configure repetition factor of the PRS and/or the SRS such that the PRS is configured within the first downlink slots and the SRS is configured within the last uplink slots.

In one embodiment, the PRS and the SRS may be not configured within slots with only flexible symbols. The slots with only flexible symbols may be located in a central part of a dynamic TDD configuration, wherein the flexible symbols may comprise symbols for both downlink and uplink. In another embodiment, a comb-N pattern, the periodicity, the slot offset and the repetition factor of the PRS and the SRS may be configured such that the PRS and the SRS are configured within slots with only flexible symbols, In one embodiment, the base station may identify whether the required QoS level is met. When the required QoS level is not met, the base station may re-configure the resource set configuration of the PRS and the SRS to align with the slot configuration information of the D-TDD.

In one embodiment, the slot configuration information of the D-TDD may be applied across all cells in a network. As a result, a similar periodicity, a similar slot offset and a similar repetition factor may be applied for the PRS and/or the SRS across all the cells.

Figure 5:
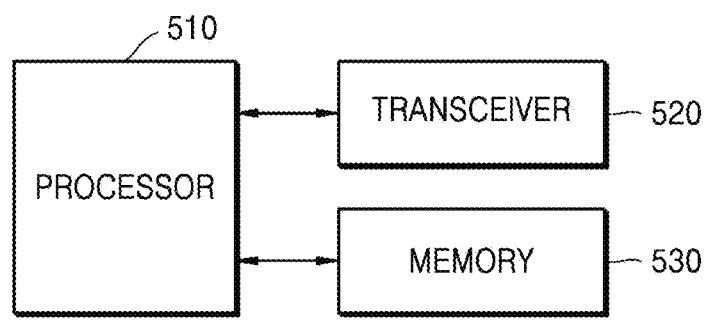
FIG. 5 illustrates a gNB according to an embodiment of the present disclosure.

FIG. 5 schematically illustrates a gNB according to an embodiment of the present disclosure.

Referring to the FIG. 5, the gNB 500 may include a processor 510, a transceiver 520 and a memory 530. However, all of the illustrated components are not essential. The gNB 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the gNB 500 may be implemented by the processor 510.

The processor 510 may detect a PUCCH on a configured control resource set. The processor 510 determines a method for dividing CBs and a method for rate matching of a PUSCH according to the PUCCH. The processor 510 may control the transceiver 520 to receive the PUSCH according to the PUCCH. The processor 510 may generate HARQ-ACK information according to the PUSCH. The processor 510 may control the transceiver 520 to transmit the HARQ-ACK information.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the gNB 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Figure 6:
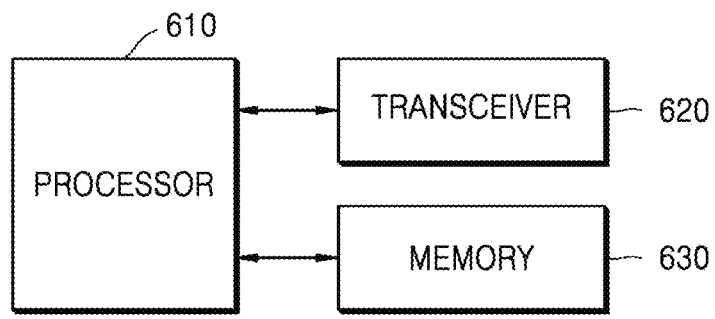
FIG. 6 illustrates a user equipment (UE) according to an embodiment of the present disclosure.

FIG. 6 illustrates a user equipment (UE) according to an embodiment of the present disclosure.

Referring to the FIG. 6, the UE 600 may include a processor 610, a transceiver 620 and a memory 630. However, all of the illustrated components are not essential. The UE 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the UE 600 may be implemented by the processor 610.

The processor 610 may detect a PDCCH on a configured control resource set. The processor 610 determines a method for dividing CBs and a method for rate matching of a PDSCH according to the PDCCH. The processor 610 may control the transceiver 620 to receive the PDSCH according to the PDCCH. The processor 610 may generate HARQ-ACK information according to the PDSCH. The processor 610 may control the transceiver 620 to transmit the HARQ-ACK information.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the UE 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

The invention claimed is:

1. A method, performed by a base station, for locating a User Equipment (UE), in a wireless communication, the method comprising:
   receiving, from a Location Management Function (LMF) or the UE, a positioning request for the UE;

identifying whether dynamic TDD (D-TDD) is currently implemented; and when the D-TDD is currently implemented, configuring a resource set configuration of a Position Reference Signal (PRS) and a Sounding Reference Signal (SRS) based on slot configuration information of the D-TDD, wherein the resource set configuration of the PRS and the SRS comprises at least one of a periodicity, a slot offset and a repetition factor of the PRS and the SRS.

2. The method of claim 1, wherein the slot configuration information of the D-TDD comprises a slot configuration period, a number of downlink slots and a number of uplink slots, wherein the PRS is configured within a first downlink slots and the SRS is configured within a last uplink slots.

3. The method of claim 1, wherein the PRS and the SRS are not configured within slots with only flexible symbols, wherein the slots with only flexible symbols are located in a central part of a dynamic TDD configuration, wherein the flexible symbols comprise symbols for both downlink and uplink.

4. The method of claim 2, wherein the periodicity of the PRS and/or the SRS is configured to an integer multiple of the slot configuration period.

5. The method of claim 2, wherein the slot offset of the PRS is lower than the slot offset of the SRS such that the PRS is configured within the first downlink slots and the SRS is configured within the last uplink slots.

6. The method of claim 2, wherein the repetition factor of the PRS and/or the SRS is configured such that the PRS is configured within the first downlink slots and the SRS is configured within the last uplink slots.

7. The method of claim 1, wherein the PRS and/or the SRS are configured based on a Comb-N pattern.

8. The method of claim 1, further comprising:

receiving, from the LMF, a required quality of service (QoS) level;

identifying whether the required QoS level is met; and when the required QoS level is not met, re-configuring the resource set configuration of the PRS and the SRS to align with the slot configuration information of the D-TDD, wherein the required QoS level comprises at least one of accuracy requirements and latency requirements.

9. The method of claim 1, wherein the slot configuration information of the D-TDD is applied across all cells in a network, wherein a similar periodicity, a similar slot offset and a similar repetition factor are applied for the PRS and/or the SRS across all the cells.

10. The method of claim 2, wherein a comb-N pattern, the periodicity, the slot offset and the repetition factor of the PRS and the SRS are configured such that the PRS and the SRS are configured within slots with only flexible symbols, wherein the slots with only flexible symbols are located in a central part of a dynamic TDD configuration, wherein the flexible symbols comprise symbols for both downlink and uplink.

11. A base station for locating a User Equipment (UE), in a wireless communication, the base station comprising:

a transceiver; and at least one processor configured to:

receive, from a Location Management Function (LMF) or the UE, a positioning request for the UE;

identify whether dynamic TDD (D-TDD) is currently implemented; and when the D-TDD is currently implemented, configure a resource set configuration of a Position Reference Signal (PRS) and a Sounding Reference Signal (SRS) based on slot configuration information of D-TDD, wherein the resource set configuration of the PRS and the SRS comprises at least one of a periodicity, a slot offset and a repetition factor of the PRS and the SRS.

12. The base station of claim 11, wherein the slot configuration information of the D-TDD comprises a slot configuration period, a number of downlink slots and a number of uplink slots, wherein the PRS is configured within a first downlink slots and the SRS is configured within a last uplink slots.

13. The base station of claim 11, wherein the PRS and the SRS are not configured within slots with only flexible symbols, wherein the slots with only flexible symbols are located in a central part of a dynamic TDD configuration, wherein the flexible symbols comprise symbols for both downlink and uplink.

14. The base station of claim 12, wherein the periodicity of the PRS and/or the SRS is configured to an integer multiple of the slot configuration period.

15. The base station of claim 12, wherein the slot offset of the PRS is lower than the slot offset of the SRS such that the PRS is configured within the first downlink slots and the SRS is configured within the last uplink slots.

* * * * *